(12) United States Patent
Lindstrom et al.

(10) Patent No.: US 9,938,664 B2
(45) Date of Patent: Apr. 10, 2018

(54) METHOD AND ARRANGEMENT FOR CLARIFYING GREEN LIQUOR (71) Applicants: Mikael Lindstrom, Lidingo (SE); Christofer Lindgren, Stockholm (SE); Lennart Borjeson, Hammaro (SE); Lennart Kallen, Forshaga (SE)

(72) Inventors: Mikael Lindstrom, Lidingo (SE); Christofer Lindgren, Stockholm (SE); Lennart Borjeson, Hammaro (SE); Lennart Kallen, Forshaga (SE)

(73) Assignee: CLEANFLOW AB, Karlstad (SE)

( * ) Notice: Subject to any disclaimer, the term of this patent is extended or adjusted under 35 U.S.C. 154(b) by 48 days.

(21) Appl. No.: 15/187,210

(22) Filed: Jun. 20, 2016

(65) Prior Publication Data

US 2017/0051454 A1 Feb. 23, 2017

Related U.S. Application Data (62) Division of application No. 13/257,606, filed as application No. PCT/SE2010/050348 on Mar. 30, 2010, now abandoned.

(30) Foreign Application Priority Data

Apr. 2, 2009 (SE) ...................................... 0950213

(51) Int. Cl.
*D21C 11/00* (2006.01)
*B01D 69/04* (2006.01)
(Continued)

(52) U.S. Cl.
CPC ........ *D21C 11/0078* (2013.01); *B01D 61/142* (2013.01); *B01D 61/147* (2013.01);
(Continued)

(58) Field of Classification Search
None
See application file for complete search history.

(56) References Cited

U.S. PATENT DOCUMENTS 5,262,053 A 11/1993 Meier
5,618,443 A 4/1997 Engdahl
(Continued)

OTHER PUBLICATIONS

International Search Report and Written Opinion (dated Jul. 3, 2010).
(Continued)

*Primary Examiner* — Krishnan S Menon
(74) *Attorney, Agent, or Firm* — Jeffrey S. Melcher; Manelli Selter PLLC (57) ABSTRACT

Green liquor clarification comprising filtering of a flowing suspension containing solids, wherein the suspension is brought into contact with a first filter unit (4), said 5 filter unit (4) comprising one or several filter elements (12) comprising one or several filter bodies (3) having filter channels (33) within the filter bodies (3) with a filtering layer (32), a part of the suspension is forced to pass through the filtering layer (32) from a first/inner surface (32A) to a second/outer surface (32B) of the filtering layer (32) forming a filtrate while the solids substantially remains in a residual part of the suspension forming a slurry and where the filtering layer (32) is made of a membrane material with pores, said pores having a pore size of 0.1-10 micrometer, more preferred 0.1-5 micrometer and most preferred 0.2-1.0 micrometer.

13 Claims, 6 Drawing Sheets (51) Int. Cl.
*B01D 61/14* (2006.01)
*B01D 71/02* (2006.01)

(52) U.S. Cl.
CPC ............ *B01D 69/04* (2013.01); *B01D 71/02* (2013.01); *B01D 2311/25* (2013.01); *B01D 2317/02* (2013.01); *B01D 2325/02* (2013.01)

(56) References Cited

U.S. PATENT DOCUMENTS

| | | |
|---|---|---|
| 5,628,875 A | 5/1997 | Liden |
| 6,123,806 A | 9/2000 | Roberts |
| 2004/0173531 A1 | 9/2004 | Hammond |

OTHER PUBLICATIONS

Brostrom, F., Gronluthltrering med Crossflow-filter, TRITA-CHE-report 2007: 66 ISSN 1654-1081, pp. 1-42.

European Office Action issued in EP application No. 10 759 123.2-1104, dated Jan. 26, 2018, pp. 1-7.

Gan Q, "Beer Clarification by microfiltration-product quality control and fractionation of particles and macromolecules," Journal of Membrane Science, Elsevier Scientific Publ. Comp., Amsterdam, NL, vol. 194, No. 2, Dec. 15, 201, pp. 185-196.

Liu, "Application of inorganic membranes in the alkali recovery process," Deslaination Elsevier, Amsterdam, NL, vol. 169, No. 2, Oct. 1, 2004, pp. 193-205.

METHOD AND ARRANGEMENT FOR CLARIFYING GREEN LIQUOR

FIELD OF THE INVENTION

The present invention relates to the pulp industry, more specifically to the chemical recovery of the chemical pulping process. The invention describes a filtering method and arrangement for clarifying green liquor.

BACKGROUND INFORMATION

During the pulping of the chips lignin and other substances in the chips are dissolved into the pulping liquid.

In order to recover the pulping chemicals (as well as to produce energy) the black liquor is concentrated and then sent to a recovery boiler. The concentrated black liquor is combusted in the recovery boiler and heat is extracted from the hot flue gases. The sodium and sulfur compounds are recovered as sodium carbonate and sodium sulfide. The sodium carbonate and sodium sulfide exit the recovery boiler in a molten state and are dissolved in a water solution (weak white liquor) thus forming green liquor.

The green liquor formed also contains small amounts of solid material, known as green liquor dregs or green liquor sludge. Because of the content of dregs in the green liquor, the green liquor needs to be clarified with respect to these dregs. One way to clarify the green liquor is by sedimentation another way is by filtration.

The chemical recovery is very often a bottleneck in the production of cellulose pulp and when the mills raise the production there is a need of raising the capacity of the chemical recovery process. Building larger apparatus for sedimentation of the green liquor is, however, a costly and complicated choice since the diameter the tank becomes large. Generally, clarification by sedimentation results in regenerated cooking chemicals with a high content of sludge. It is of great importance to keep the sludge content a low level in the cooking chemicals, otherwise the sludge will cause scaling and plugging in the pulping plant and the evaporation plant, which leads to unwished and unplanned, costly operation stops.

A general problem with filtration of green liquor is the low filtering capacity because of the poor filterability of the green liquor. The dregs in the green liquor form a dense cake on the filtering layer and blind the filtering medium thus lowering the filtering capacity even more. The filter cake must be removed and thereby causing production stops leading to lowered productivity and higher operating costs.

The document U.S. Pat. No. 5,3618,443 relates to clarification of green liquor by falling-film filtration. The filtering material is made of textile cloth. The apparatus described comprises a pressurized vessel in which several filter elements are mounted in a vertical position, or generally vertical position, and the liquid to be filtered flows due to the gravitational force along the filtering layers on the outside of the filter elements. Due to pressure difference, caused by pressurized gas, between outer and inner surfaces of the filter elements, the filtrate penetrates the filter surface from the outer side to the inner side of the filter surface of the elements and reaches the filtrate channel surrounded by the filtering layers.

A problem with prior art technique described above is the low filtering efficiency leading to large equipments and with high investment costs and a relative high energy consumption.

In order to solve the problems connected with clarification of green liquor, a filtering technique using a new kind of filter has been investigated. The filtering technique, hereinafter called cross-flow filtration, is described in a final thesis at the Royal Institute of Technology, Stockholm, by Fredrik Broström, 2007, TRITA-CHE-report 2007:66 ISSN 1654-1081.

The cross flow-filter comprises a long tubular ceramic membrane element perforated with several channels in its length direction. The green liquor is transported into the channels and while flowing through the channels the filtrate passes through the porous membrane channel walls and flows in a radial direction from the inside to the outside of the channels. The pore size of the ceramic membrane used was 45 µm.

However, in the thesis work the green liquor filtrate flow decreased rapidly, within 1 day the flow was ⅙ of the initial flow. This should according to the author be solved by controlling the inlet flow to the cross-flow filter.

SUMMARY OF THE INVENTION

It is an object of the present invention to overcome the drawbacks and disadvantages of the above described filtering methods for clarification of green liquor.

Surprisingly, we have found that a filter pore size >0.10 µm but significantly lower than the 45 µm used in the thesis work, preferably a filter pore size of 0.1-10 µm, more preferred 0.1-5 µm and most preferred 0.2-1.0 µm and controlling the green liquor filtrate flow prevents the observed capacity decrease.

Figure 1:
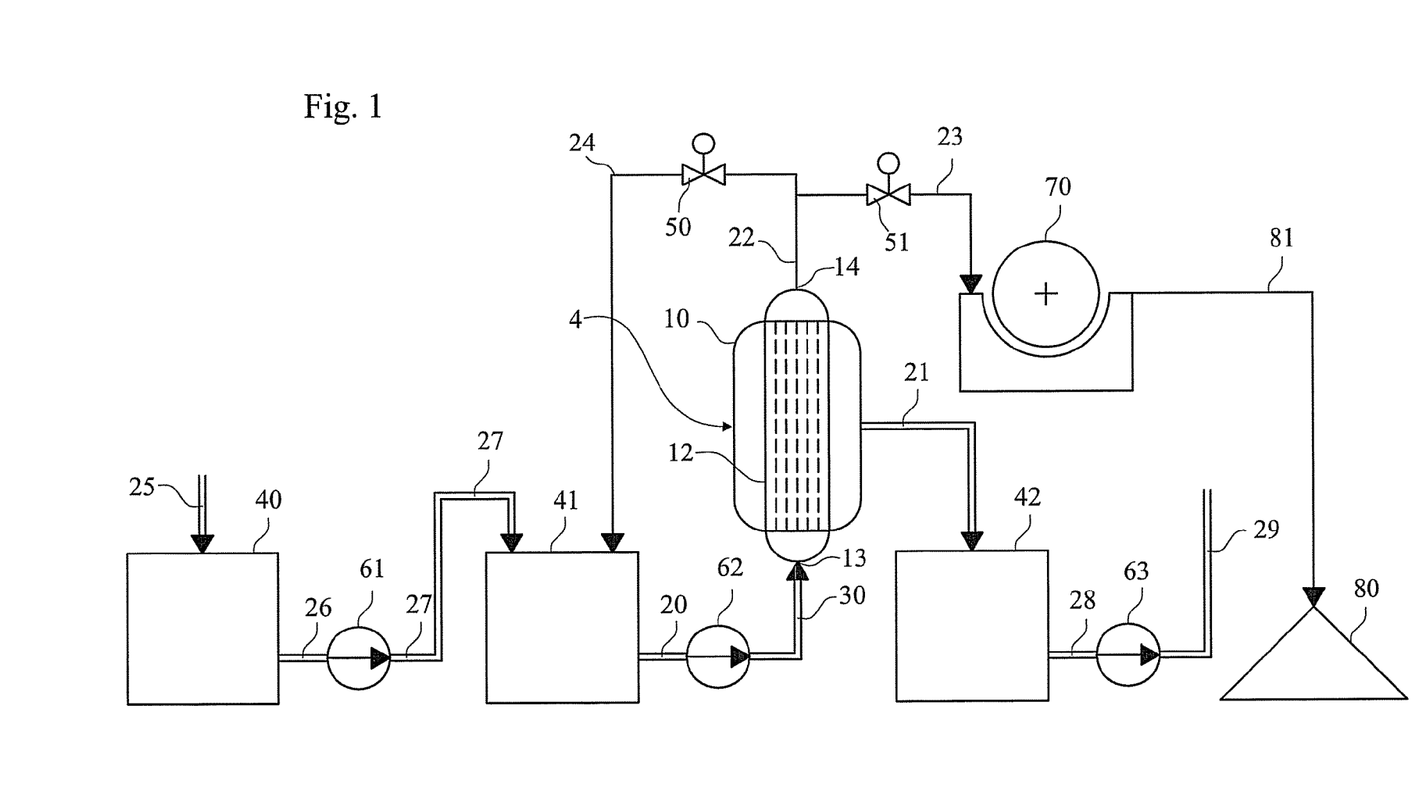
FIG. 1 schematically shows a preferred embodiment of an arrangement for cleaning green liquor using cross-flow filtration for practising the invention.

According to one aspect of the invention, since the flowing suspension is forcibly caused to flow, one important feature of the invention is the possibility to place the filter elements in any direction and any inclination to the gravitational force since it is a source of energy and not gravitational forces that forces the suspension to flow. If the filtering arrangement is to be mounted into an existing system and the space is limited the possibility to place the filter elements in any direction/any inclination is a great advantage. As shown in FIG. 1 the suspension to be filtered is forced to flow upstream against the direction of the gravitational force.

According to another aspect of the invention Reynold Number is preferably higher than 10,000, but lower than 45,000, more preferred 10,000-25,000, and most preferred 12,000-17,000.

According to yet another aspect of the invention the green liquor filtrate flow should be less than 50% of the flowing suspension, preferably less than 40% and most preferred less than 30% but not lower than 5%.

According to another aspect of the invention, the use of converging cross-sectional area of the filter channels as an alternative to cylindrical facilitates constant flow rate or constant Reynold Number trough the filter channel.

According to another aspect of the invention, the flow of filtrate is regulated by controlling the pressure of the green liquor flowing in to the filter and the Reynolds Number is regulated by controlling the flow of slurry out from the filter.

According to still another aspect of the invention, the cross-flow filter is connected in series with at least one additional cross-flow filter in such a way that a partial flow of the slurry from the first filter unit is led to an inlet of the additional filter unit for an additional filtration.

According to yet another aspect of the invention, the cross-flow filter is connected in parallel with at least one additional cross-flow filter.

According to yet another aspect of the invention, the cross-flow filter is connected to an already existing cleaning unit for green liquor in order to boost the capacity of the existing cleaning plant. The filter unit is arranged as a first filtering step before final cleaning in the already existing cleaning unit.

According to still another aspect of the invention, the cross-flow filter is connected to an already existing cleaning unit for green liquor in order to increase the degree of purity of the already cleaned green liquor. The filter unit is arranged to filter already cleaned green liquor.

According to yet another aspect of the invention, the cross flow filter is a replacement for an existing cleaning unit for green liquor,

BRIEF DESCRIPTION OF THE DRAWINGS

The invention will be described in more detail with reference to the enclosed figures, in which.

DETAILED DESCRIPTION OF THE PREFERRED EMBODIMENTS

The cross-flow filter consists of a filter unit comprising one or several filter elements. These filter elements are provided with a plurality of filter bodies, each filter body comprising a filter channel.

The filter body also comprises porous filter walls surrounding the channels. Each filter body comprises a supporting structure and in conjunction with the filter walls, which may be integral therewith. In a preferred embodiment the filtering layer is applied as a coating on the inside of the supporting structure. The coating may in some preferred installations have filter pores of a filter pore size of 0.2 to 1.0 micrometer. In other installations other pore sizes may be more advantageous, but would normally be within the range 0.1 to 10 micrometer.

The filter walls in this embodiment may be made of a ceramic material. The interior diameter of the filter channels provided within the filter elements is 1-10 mm and the length of the filter channels is preferably 0.5-3 m, more preferred 0.7-2.2 m and most preferred 0.8-1.5 m.

The green liquor is forcibly caused to flow into the filter channels of the filter unit. The passage of the green liquor through the filtering layer—the membrane—is forced by a pressure difference between the in- and outside of the filter walls. The pressure inside the channels is 0.2-2 bar higher than the pressure outside the filter walls thereby forcing some of the green liquor to pass through the inside of the channel walls to the outside of the walls in a radial direction and perpendicular to the direction of the channels.

Since the size of the pores of the membrane is of micrometer scale the passage of the dregs through the membrane is prevented and the dregs continue their flow in the remaining suspension through the channels to the end opposite to the inlet and leaves the filter body as a slurry.

Exemplary filtering arrangement according to the invention illustrated in FIG. 1 comprises filter unit 4 comprising a filter housing 10, in which one or more filter elements 12 is mounted. The filter element 12 comprises longitudinal filter bodies, which preferably are in the form of tubes and having filter channels within the filter bodies. The filter channels have a first surface on the inside of the filter walls surrounding the filter channels and a second surface on the outside of the filter walls surrounding the filter channels.

Chemicals to be recovered from the soda boiler is led via conduit 25 into tank 40 and is dissolved in weak liquor, forming green liquor. The green liquor is led via conduit 26 to a pump 61 and pumped via conduit 27 into tank 41. From tank 41 via conduit 20 the suspension to be filtered passes pump 62 and is pumped via conduit 30 to an inlet 13 and further into the filter channels within the filter element 12. A part of the suspension is forced to pass the filtering layer from an inside/a first/inner surface to an outside/a second/outer surface of the filtering layer and forming a filtrate while the solids substantially remains in a residual part of the suspension, forming a slurry. The cleaned filtrate is collected in the filter housing 10 and the filtrate is led from the filter housing 10 through conduit 21 to a collecting tank 42. The cleaned filtrate (cleaned green liquor) is then led via conduit 28 to a pump 63 and is pumped via conduit 29 to the white liquor preparation (not shown).

The slurry, containing the dregs, passes outlet 14 and a partial flow of the slurry passes valve 50 and is recirculated via conduit 24 to tank 41 while another partial flow of the slurry passes valve 51 and is via conduit 23 led to a mud filter 70 for dewatering and thereafter via conduit 24 to a landfill 80.

Figure 2:
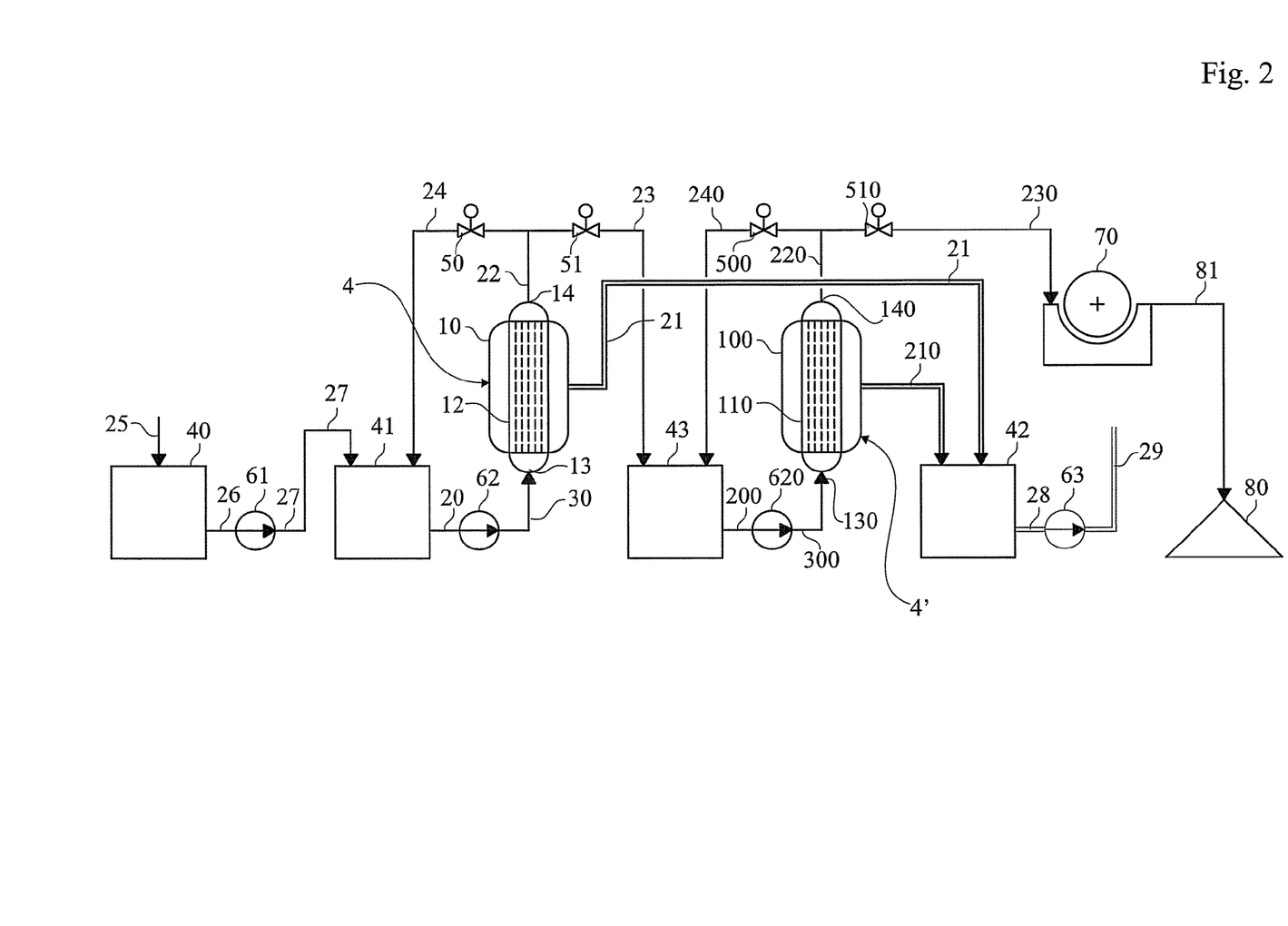
FIG. 2 shows an alternative arrangement with two cross-flow filters connected in series.

FIG. 2 is an alternative to the arrangement shown in FIG. 1 and shows two filter units 4, 4' connected in series. A partial flow of the slurry received from the first filter unit 4 passes control valve 51 and is led via conduit 23 to a tank 43. In the tank 43 the incoming slurry from the first filter stage is collected and mixed with the recirculated slurry from the second filtering stage. The slurry is then led via conduit 200 to the pump 620 and is pumped via inlet 130 into the second filter unit 4' and forced to flow through the filter channels. The filtrate is collected in filter housing 100 and is led from the filter housing 100 via a conduit 210 to the collecting tank 42. The filtrate is then led via conduit 28 to a pump 63 and is pumped via conduit 29 to the white liquor preparation (not shown).

The up-concentrated slurry passes outlet 140 and a partial flow of the slurry passes valve 500 and is recirculated via conduit 240 to tank 43 and is mixed with the slurry received from the first filtering stage via conduit 23.

Another partial flow of the up-concentrated slurry passes valve 510 and is via conduit 230 led to a mud filter 70 for dewatering and is afterwards led via conduit 24 to landfill 80.

The first filter unit 4 may for instance be used under milder conditions, i.e. lower Reynolds Number which means decreased cavitation within the filter channels leading to decreased wear of the filter bodies in order to increase its life-time. Because the slurry concentration is lower this filter will be less prone to clogging and therefore a filter with a larger pore diameter may, in some applications, beneficially be used in this position. In addition, the need to stop the filtration to clean the filter is decreased leading to higher availability and production. The second filter unit 4" could then be used at tougher conditions due to the higher dregs concentration, with higher flow velocities, smaller pore diameters, and more frequent cleaning, compared to the first filter unit 4

Alternatively, both filter units may be used under the same conditions.

Another advantage of two filter units in series can be of space-saving reasons. It may sometimes be easier to fit in two smaller filter housings than one big into an already existing chemical recovery unit in the mill. Of course, more than two filter units can be connected in series in order to either get enough capacity or to get enough degree of purification or of space-limited reasons where one or two bigger filter units are replaced by several smaller filter units which are easier to fit in into the existing chemical recovery unit.

It is of course possible to connect one or more filter units in parallel to the first filter unit, resulting in a "first set of filter units in parallel", and to recirculate a partial flow of the dregs slurry from this "first set of filter units in parallel" while another partial flow of the dregs slurry from the "first set of filter units in parallel" is led to a filter unit connected in series with the "first set of filter units in parallel". This alternative is not shown.

An alternative of having only one filter unit for further filtering the dregs slurry from the "first set of filter units in parallel" is to have two or several filter units connected in parallel, resulting in a "second set of filter units in parallel". Connecting a "first set of filter units in parallel" with "second set of filter units in parallel" result in increased capacity of the clarification process as well as in a very well purified green liquor. It may also be easier to fit in several small filters than one or two big filters into an existing chemical recovery plant, as mentioned above. This alternative is not shown.

Figure 3:
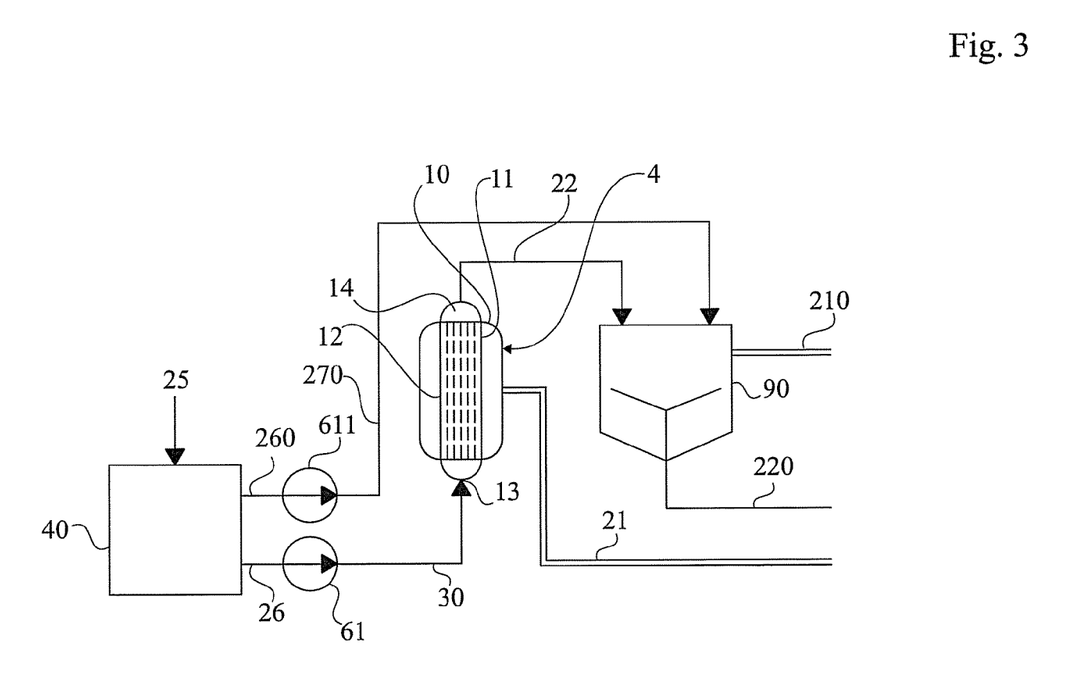
FIG. 3 shows an arrangement where the cross-flow filter is used as a capacity booster of an existing green liquor cleaning unit.

FIG. 3 shows a capacity booster arrangement. The filter unit 4 is used as a capacity booster of an existing green liquor cleaning plant and the chemicals to be recovered from the soda boiler is led via conduit 25 into tank 40 and is dissolved in weak liquor, forming green liquor. A partial flow of the green liquor is led via conduit 26 to a pump 61 and pumped via conduit 30 to the inlet 13 of the filter elements 12 of the filter unit 4. The cleaned filtrate is led via conduit 21 to the white liquor preparation while the slurry passes outlet 14 and is via conduit 22 led to further purification in the green liquor clarifier 90.

Another partial flow of the green liquor is led from the dissolving tank 40 via conduit 260 to a pump 611 and the green liquor is pumped via conduit 270 to the green liquor clarifier 90. The cleared green liquor is led away by conduit 210. The dregs slurry leaves the green liquor clarifier 90 via conduit 220.

FIG. 3 schematically shows either a way to decrease the load of the green liquid clarifier by cross-flow filtration of a partial flow of the green liquor or a way to increase the capacity of the chemical recovery unit by introducing a cross-flow filtration step for taking care of a partial flow of the increasing amounts of green liquor needed to be cleaned when the clarifier is already working at its maximum capacity. The combined green liquor flow in conduits 21 and 220 is led to the white liquor preparation and will have a substantially reduced content of dregs due to the fact that the liquor in conduit 21 is virtually free from dregs while the decreased load on the clarifier 90 will decrease the dregs content in conduit 220 as well.

Alternatively, all green liquor from tank 40 may be passed through conduit 26 to the filter unit 4 to maintain a suitable flow of liquor through the filter channels before passing the excess liquor to the clarifier 90 through conduit 22.

Figure 4:
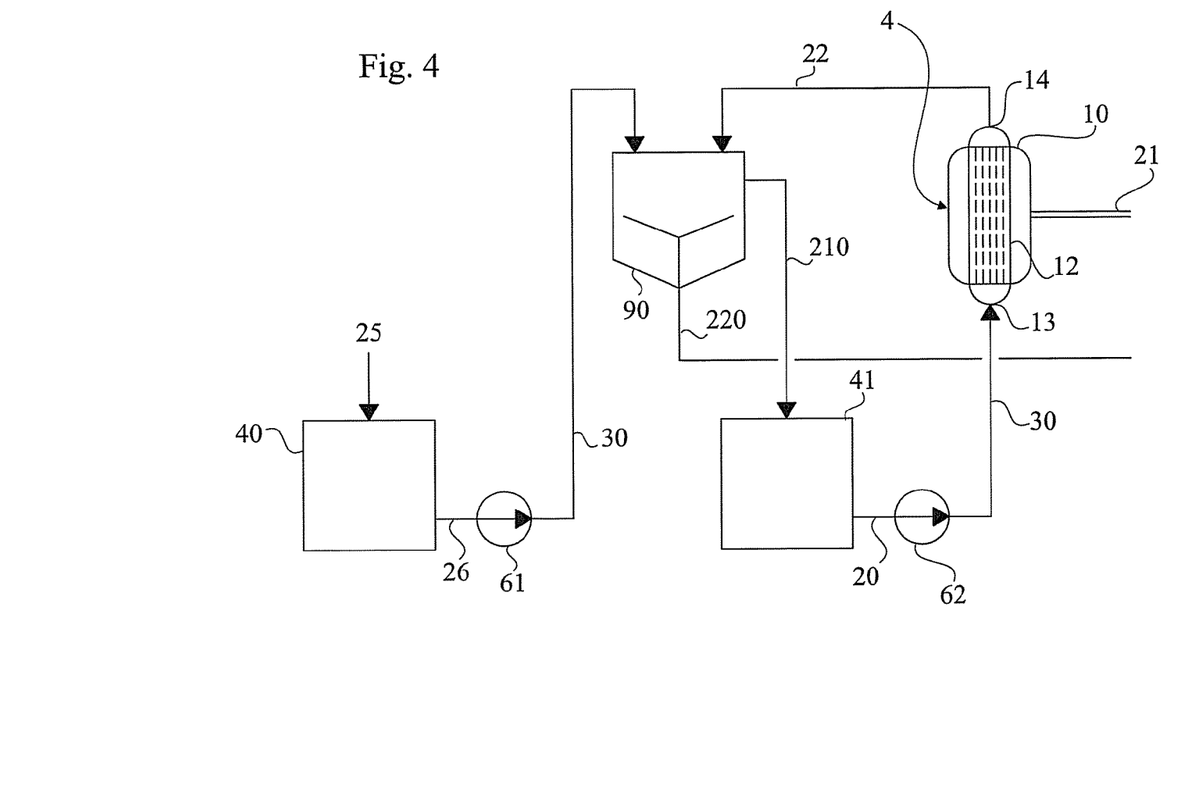
FIG. 4 shows an arrangement where an existing green liquor cleaning unit is complemented with a cross-flow filter in order to increase the degree of purification of the already cleaned green liquor.

FIG. 4 shows an arrangement for polishing of clarified green liquor. An existing green liquor cleaning plant is complemented with a filter unit 4 in order to increase the degree of purification of the already cleaned green liquor. The clarified green liquor from the clarifier 90 is led via conduit 210 to a collecting tank 41 and is by pump 62 forced to flow via conduit 30 to the inlet 13 of the filter elements 12 of the filter unit 4 and further in to the filter channels where the clarified green liquor is filtrated for final separation of solids. The cleaned filtrate is led away by conduit 21 and has a very high degree of purification.

The recirculation of the partial flow of the slurry (corresponding to conduit 24 in FIG. 1, conduits 24 and 240 in FIG. 2 and conduit 22 in FIG. 4) secures that Reynolds Number of the flow is maintained during the flow along the filter channels. Otherwise, in the case of no recirculation, the velocity of the suspension will decrease along the passage of the filter channels, which will lead to the build-up of a filter cake on the filtering layers, which in turn will lower the filtering efficiency. The recirculation also insures that the desired relationship between the inlet flow and the filtrate flow is maintained at the predetermined level.

Figure 5A:
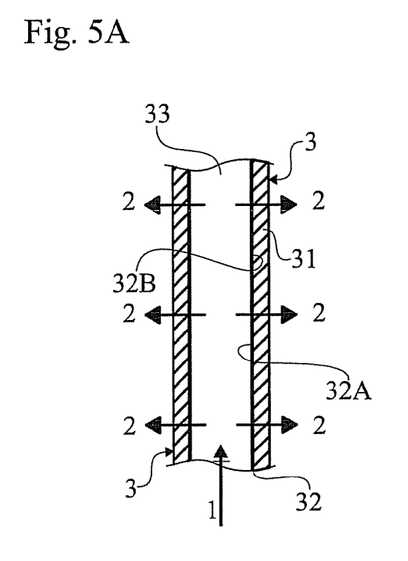
FIGS. 5A and 5B show a cross-sectional side view of A) a filter body with a cylindrical filter channel and B) a filter body with a converging filter channel.

FIG. 5A shows a cross-sectional side view a filter body 3 in its length direction. The filter body 3 has a cylindrical shape and comprises a supporting structure 31 and a filter channel 33. The inside surface of the supporting structure 31 has a filtering layer 32 covering the whole inside surface of the supporting structure 31. The filtering layer 32 has a first/an inner surface 32A and a second/outer surface side 32B and is provided with pores in the range of about 0.2 to 1.0 micrometer.

The arrow 1 shows the direction of the incoming flowing suspension. The arrow 2 shows the direction of a portion of the flowing suspension passing through, firstly, the first/inner surface of the filter layer 32A of the filtering layer 32, then through the filtering layer 32 and further through the second/outer surface 32B of the filtering layer 32 and still further through the supporting structure 31 to the outside of the supporting structure 31. The portion of the flowing suspension has now been filtrated thus forming a filtrate consisting of cleaned green liquor.

Figure 5B:
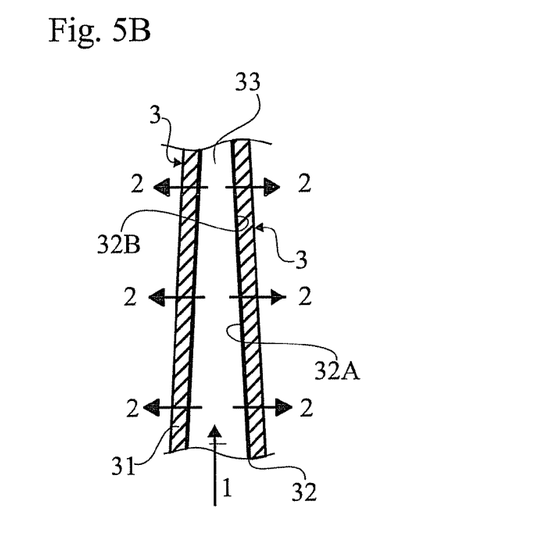

FIG. 5B shows a cross-sectional side view of a filter body 3 with a converging filter channel 33. An alternative to cylindrical filter channels 33 with a circular cross-sectional area would be to use filter channels 33 having an converging cross-sectional area. Suspensions flowing in filter channels 33 with a converging cross-sectional area will maintain its Reynolds Number or flow rate during the flow within the entire length of the filter channels despite the fact that the volumetric flow rate within the channels decreases as a result of the penetration of suspension through the filter surfaces. The suspension will maintain its velocity or Reynolds Number and no filter cake will be built up on the filter surface thanks to the maintained velocity.

Figure 6:
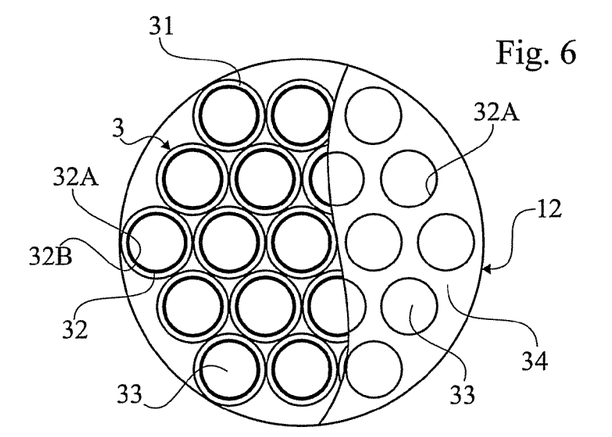
FIG. 6 shows a front view of a filter element having several filter bodies with filter channels as well as the end plate.

FIG. 6 shows a front view of a filter element 12 having several filter bodies 3. The filter body 3 comprises a supporting structure 31 and a filter channel 33. The inside surface of the supporting structure 31 has a filtering layer 32 covering the whole inside surface of the supporting structure 31. The filtering layer 32 has a first/inner surface 32A and a second/outer surface 32B.

FIG. 6 also shows an end plate 34 covering the whole end area of the filter element 12 except for the filter channels 33. The end plate 34 is fixed to the end of the filter bodies 3 and has through bores of the same diameter as the diameter of the filter channels 33. The flowing suspension to be filtered reaches the end plate 34 and passes through the through bores of the end plate 34 and flows into the filter channels 33 whereby a portion of the flowing suspension is to be filtered while another portion of the flowing suspension continues to flows in the filter channel 33. The end plate 34 steers the incoming flowing suspension to the filter channels 33. Another feature of the end plate 34 is that is that it supports the filter bodies 3 and keeps them fixed in their positions.

In FIG. 6 the filter bodies 3 are placed so tightly to each other that each filter body 3 is in contact with neighbouring filter bodies 3. The filter bodies 3 may be placed so close to each other that the wall 31 of a filter channel also is part of the wall of the neighbouring filter bodies.

The filter bodies shown in FIG. 6 are cylindrical thus giving rise to vacant spaces between the filter bodies.

It is understood that the filter bodies 3 do not have to be placed so tightly to each other that each filter body 3 is in contact with the neighbouring filter bodies 3. Thanks to the end plate 34 which supports and fixes the filter bodies 3 the filter bodies within the filter element 12 could be sparsely placed thus not being in contact with each other.

Figure 7:
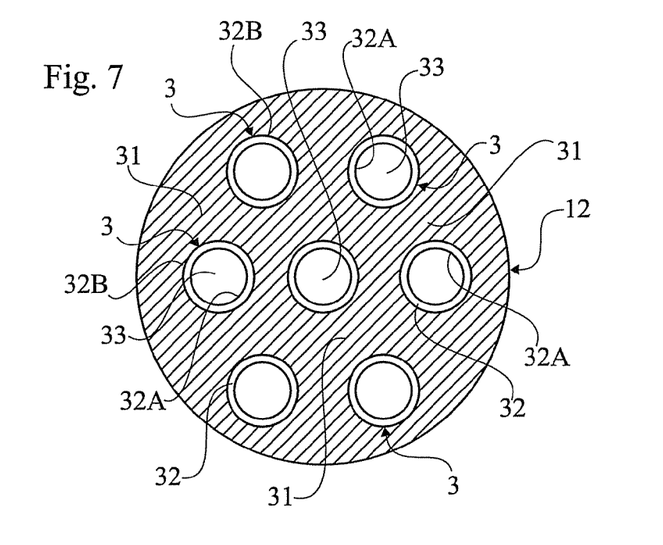
FIG. 7 shows a cross-sectional front view of a filter element filled with supporting structure having several filter channels

FIG. 7 shows cross-sectional front view of a filter element 12. The filter element 12 has a cylindrical form and a circular cross-sectional area. In this embodiment the filter element 12 is homogeneously filled with supporting structure 31. The supporting structure 31 is perforated in its length direction with filter bodies 3. The filter body 3 comprises a filter channel 33. The inside surface of the filter body 3 is covered its whole surface with a filtering layer 32 which has a first filtering layer 32A and a second filtering layer 32B. The flowing suspension to be filtered flows inside the filter channels 33 and a portion of the flowing suspension passes through, firstly, the first/inner surface of the filter layer 32A of the filtering layer 32, then through the filtering layer 32 and further through the second/outer surface 32B of the filtering layer 32 and still further through the supporting structure 31 to the outside of the supporting structure 31 and to the outside of the filter element 12 to be collected in the filter housing 10, 100, shown in FIGS. 1 and 2.

In accordance with an embodiment of the invention the green liquor filtrate flow should be a certain predetermined fraction of the total flow of green liquor through the filter channels, at the same time the total flow of green liquor through the filter has to be controlled in order to maintain the desired Reynolds Number. With reference to FIG. 3, the flow and pressure of the filtrate in conduit 21 is measured together with the pressure in conduit 30 and the flow in conduit 22. The flow of filtrate is set by mill conditions that require a certain production of purified green liquor, the pump 61 is controlled to provide such a pressure in conduit 30 that this requirement is met. At the same time the flow in conduit 22 is set with a valve (not shown), so that the desired Reynolds Number is maintained in the filter bodies. The pressure difference between conduits 21 and 30 provide information on the condition of the filter elements and is used to determine when the unit has to be shut down for cleaning.

Reynolds Number is used to characterize different flow regimes, such as laminar or turbulent flow: laminar flow occurs at low Reynolds numbers, where viscous forces are dominant, and is characterized by smooth, constant fluid motion, while turbulent flow occurs at high Reynolds numbers and is dominated by inertial forces, which tend to produce random eddies, vortices and other flow fluctuations.

For flow in a pipe or tube, the Reynolds number is generally defined as:

$$Re = \frac{\rho VD}{\mu} = \frac{VD}{v} = \frac{QD}{vA}$$

where:
V is the mean fluid velocity in (SI units: m/s)
D is the diameter (m)
$\mu$ is the dynamic viscosity of the fluid (Pa·s or N·s/m$^2$)
$v$ is the kinematic viscosity ($v=\mu/\rho$) (m$^2$/s)
$\rho$ is the density of the fluid (kg/m$^3$)
Q is the volumetric flow rate (m$^3$/s)
A is the channel cross-sectional area (m$^2$)

As will be understood by those skilled in the present field of art, numerous changes and modifications may be made to the above described and other embodiments of the present invention, without departing from its scope as defined in the appending claims.

For example, the filtration of the flowing suspension could of course be arranged to take place in the opposite direction meaning that the suspension flows on the outside of the filter elements and that the filtrate passes the filter wall of the elements from the outside to the inside, meaning that the filtrate will flow on the inside the filter channels within the filter elements.

Instead of a pump 61, 62 or 620 for forcibly causing the suspension to flow into the filter, another arrangement could be used, such as one pump to remove filtrate from the filter and another pump to remove the slurry, or the tank could be pressurised causing the liquor to flow through the filter or the tank 40 may be elevated so that gravity provides the necessary pressure differential. The pump can be hydraulic or electrically driven.

The filter elements 12, may have other forms such as plate and frame, capillaries, tubes, lamellas, or discs etc.

As shown in FIG. 5B, the filter body 3 has a converging form but the filter body 3 could of course have a cylindrical elongation while the filter channel could be converging thus having a converging cross-sectional area.

The cross-sectional area of the filter bodies and of the filter channels could of course have other forms such as triangular or rectangular forms. If using filter bodies with other forms than cylindrical, the volume of the vacant spaces between the filter bodies in the filter elements will vary and depend on the form of the filter bodies.

Other porous materials than ceramic materials could be used as the support structure 31, e.g different polymers and graphite.

Regarding the filtering layer 32, other porous materials could be used, e.g polymers.

It is understood that the supporting structure 31 of the filter body 3 in another embodiment could have the functions of both being a supporting structure as well as being the filtering layer itself. No extra covering with filtering properties on the inside surface of the supporting structure 31 is then needed.

FIGS. 3 and 4 show an existing green liquor cleaning plant complemented with a cross-flow filter. The clarifier 90 in the existing green liquor cleaning plant is an example of common prior art technique for clarifying green liquor. It is understood that already existing green liquor cleaning plants comprising other prior art technique, such as conventional green liquor filters, also can be complemented with a cross-flow filter.

It is also understood that there of course may exist other solutions within the scope of the invention on how to regulate the flow of the filtrate and the Reynolds Number.

The cross-flow filter can be used for purifying other suspensions within the kraft pulp mills, e.g. white liquor.

The cross flow filter may be a replacement for an existing cleaning unit for green liquor.

Following advantages are achieved with the present invention when applying it on the filtration of green liquor or similar suspensions:

The filtering process is a continuous process with no build up of a filter cake which are desirable features.

It is also a very effective process leading to a very high separation degree of dregs, up to almost 100%.

The filtrated green liquor is almost free from slurry.

Under normal operating conditions the characteristic green color of the green liquor is removed with the dregs thereby simplifying the identification both of disturbances in the filtration process and in the recovery furnace.

The investment costs for the cross-flow filtration equipment is only a fraction of the investment costs for conventional cleaning systems.

The space required is much smaller than the space required for the sedimentation tanks.

There is no contact with the surrounding air, nor is pressurized air used in the equipment, thereby minimizing oxidation/degradation of the valuable sulfide content of the green liquor.

The closed system with no contact with surrounding air or use of vacuum means that the temperature of the green liquor is maintained at a high level.

The modular design of the filters facilitates a incremental capacity increase with minimal investment cost.

The simple system with few moving parts means less labor is needed for oversight and maintenance.

Benefits due to less particles in the green liquor:

Less lime make-up or decreased content of inerts in the lime at the same make-up rate.

Less dregs carryover improves clarification of white liquor and improves mud dewatering and lower energy consumption.

Efficient removal of non-process elements for minimum operation cost and low landfill volumes.

The invention claimed is:

1. A method for clarifying green liquor comprising:
providing an arrangement for green liquor clarification comprising:
 a filter unit comprising a green liquor inlet, a slurry outlet and a filtrate outlet, and being constructed to filter green liquor;
 a source of flowing green liquor comprising a suspension of solids connected to the green liquor inlet of the filter unit;
 a pump constructed to force the flowing green liquor into the green liquor inlet to provide a Reynolds Number between 10,000-45,000 and cause a turbulent flow within the filter unit;
 a recirculation conduit connecting the slurry outlet to the source of flowing green liquor and being constructed for recirculating at least a portion of a slurry from the filter unit back to the source of flowing green liquor;
 a recirculation valve constructed to control an amount of slurry being recirculated from the slurry outlet to the source of flowing green liquor, wherein said filter unit comprising one or several filter elements, comprising one or several filter bodies having filter channels within the filter bodies with a filtering layer, during use a part of the green liquor is forced to pass through the filtering layer from a first inner surface to a second outer surface of the filtering layer forming a filtrate while the solids substantially remain in a residual part of the green liquor forming the slurry, wherein the filtering layer comprises a membrane material having pores, and said pores having a pore size of 0.1-10 micrometer, wherein the filter unit is constructed such that during use the filtrate flow from the filter unit is less than 50% of the green liquor flow into the filter unit, and the Renolds Number can be controlled by controlling the flow of the slurry out of the filer unit to provide the turbulent flow and prevent build-up of a filter cake in the filtering unit;
 a mud filter constructed for dewatering the slurry during use and form a dry solid suitable for landfill; and
 a slurry conduit connecting the slurry outlet to the mud filter;
using the pump to flow the flowing green liquor from the source of green liquor into the inlet of the filter unit inlet;
forming the slurry in the filter unit;
flowing the at least a portion of the slurry through the recirculation valve, the recirculation conduit, and the slurry outlet to the source of flowing green liquor to recirculate the at least a portion of the slurry back to the source of flowing green liquor;
flowing at least a portion of the slurry through the slurry valve and slurry conduit to the mud filter;
operating and using the pump and/or the recirculation valve to control and provide a Renolds Number between 10,000-45,000 and provide a turbulent flow and prevent build-up of a filter cake in the filtering unit, wherein the filter inlet and filter unit are constructed and operated so that the flow of green liquor through the filter unit is upstream against a direction of a gravitational force, and the filter channels have a converging cross-sectional area to maintain the Reynolds Number within an entire length of the filter channels and operating the filter and operating the arrangement to provide the Reynolds Number within the entire length of the filter channels.

2. The method according to claim 1, wherein the pores have a size of 0.2-1.0 micrometer.

3. The method according to claim 1, further comprising a slurry valve constructed to control a flow of slurry from the filter unit to the slurry conduit.

4. The method according to claim 1, operating and using the pump, the slurry valve, and/or the recirculation valve to control and provide a Renolds Number between 10,000-45,000 and provide a turbulent flow and prevent build-up of a filter cake in the filtering unit.

5. The method according to claim 1, further comprising operating and using the pump, the recirculation valve and/or the slurry valve to control and provide a Reynolds Number between 12,000-17,000.

6. The method according to claim 1, wherein said membrane material is ceramic.

7. The method according to claim 1, wherein said source of green liquor is a cleaning unit for green liquor.

8. The method according to claim 7, wherein said filter unit is arranged as a first filtering step before final cleaning of the remaining slurry in the cleaning unit.

9. The method according to claim 7, wherein the filter unit is arranged to filter cleaned green liquor.

10. The method according to claim 1, wherein the filter unit is constructed and operated such that the filtrate flow from the filter unit is less than 40% of the green liquor flow into the filter unit.

11. The method according to claim 1, wherein the filter unit is constructed and operated such that the filtrate flow from the filter unit is less than 30% of the green liquor flow into the filter unit.

12. The method according to claim 1, wherein the filter unit is constructed and operated such that the filtrate flow from the filter unit is not less than 5% of the green liquor flow into the filter unit.

13. The method according to claim 1, further comprising a conduit connecting the filtrate outlet to a white liquor preparation and supply at least a portion of the filtrate to the white liquor preparation.

* * * * *